Figure 1:
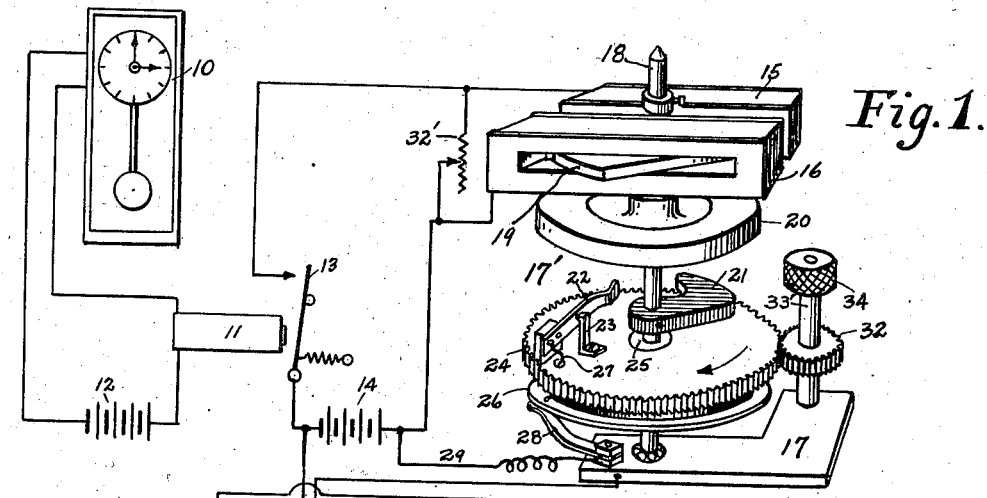

April 13, 1937.　　　A. F. POOLE　　　2,077,008
APPARATUS FOR TIMING BALANCES
Filed Nov. 19, 1932　　　3 Sheets-Sheet 1

INVENTOR
Arthur F. Poole

April 13, 1937.  A. F. POOLE  2,077,008
APPARATUS FOR TIMING BALANCES
Filed Nov. 19, 1932   3 Sheets-Sheet 2

INVENTOR
Arthur F. Poole.

April 13, 1937.  A. F. POOLE  2,077,008
APPARATUS FOR TIMING BALANCES
Filed Nov. 19, 1932  3 Sheets-Sheet 3
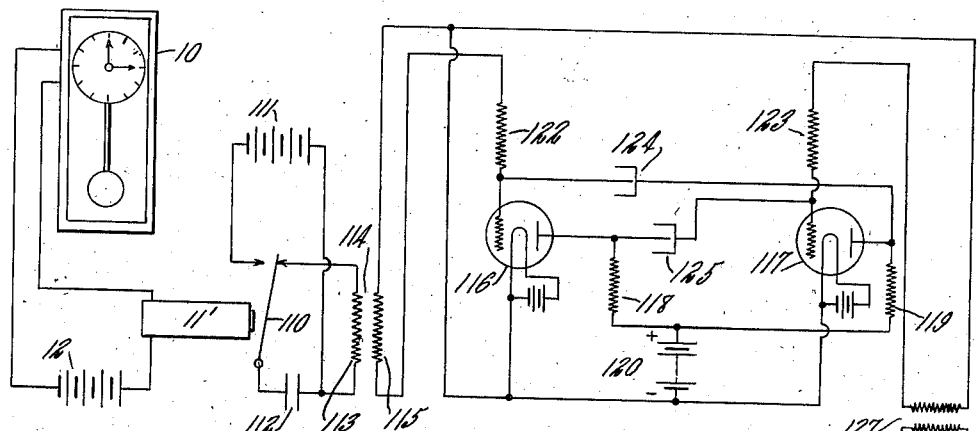
Fig. 7.
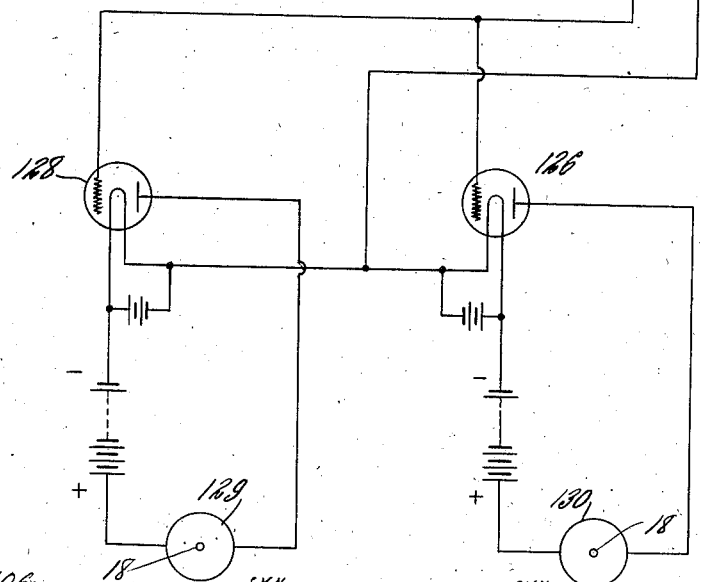
Fig. 8.
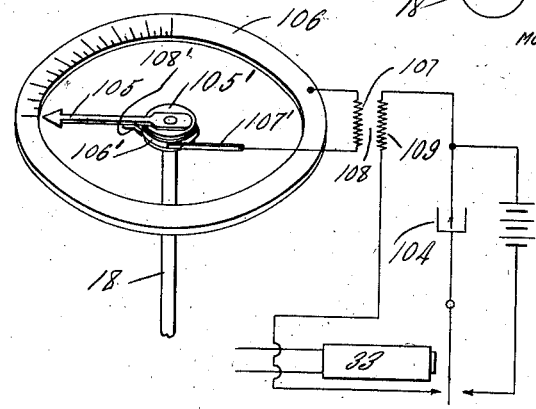
INVENTOR
Arthur F. Poole Patented Apr. 13, 1937

2,077,008

UNITED STATES PATENT OFFICE 2,077,008

APPARATUS FOR TIMING BALANCES

Arthur F. Poole, Ithaca, N. Y.; Maryline B. Poole, administratrix of said Arthur F. Poole, deceased, assignor to Maryline B. Poole, Ithaca, N. Y.

Application November 19, 1932, Serial No. 643,489

14 Claims. (Cl. 73—51)

My invention is an improved apparatus for the preliminary timing of balances before they are assembled in clocks or watches. The main object of my invention is to provide an apparatus for detecting a small variation in the time of the balance under test (hereinafter called the X balance) from the time of a standard. Another object of my invention is in the provision of means to readily adjust the hairspring of the X balance so as to bring its time to that of the standard. A further object of my invention is to provide impulse means to keep the X balance in vibration while being tested, particularly in the provision of a pneumatic impulse which will give impulse to the balance without having material connection therewith with the result that the impulse means requires no connection to the X balance when the same is put into the testing fixture for timing.

Another object of my invention is the use of the hairspring of the X balance as a means of both keeping track of the time of vibrations of the X balance and also of determining the time of the pneumatic impulses to be given to said balance. Another object of my invention is an improved impulse mechanism for a balance which has the function of automatically adjusting the effective impulse to the arc of the balance to the end of keeping the balance in a constant amplitude and avoiding the isochronal error.

Another object of my invention is a phase changer to retard the phase of the standard impulses to bring them into phase with the impulses from the X balance whereby the two may be compared. Another object of my invention is the use of a condenser circuit for comparing the X balance with the standard, and in addition so arranging this circuit that the indications thereof are given by a null method whereby variations in the electromotive force, resistance of the contacts and the duration of the same affect only the sensitivity of the indications and not their null point.

Another object of my invention is an improved fixture in which the X balance is mounted during test, details of this fixture and the new points thereof will be set forth in the following description and claims. A further object of my invention is in the use of a triode and associated circuits to translate the vibrations of the X balance into a series of electric currents which are compared in time to the standard impulses. A further object of my invention is an improved stroboscopic method of comparing the X balances with the standard, both in the use of the usual sectored disc and in a method using a jump spark to give the indication. A further object of my invention is in the provision of a multivibrator circuit as a source of standard impulses and governing this circuit by a clock; the resulting current is then amplified and used to run synchronous motors at the several testing stations so that a single source of standard currents of small wattage may be used to provide standard currents for a large number of testing stations such as would be used in a factory. A further object of my invention is the provision of a standard current of small wattage and amplifying this current at a plurality of points to run synchronous motors for testing stations thereat.

The above and other objects of my invention will be apparent to those skilled in the art as they are set forth in the following specification and claims.

Before giving a detailed description of the apparatus shown in the accompanying drawings it will be of advantage to give a brief description of the theory on which my herein described apparatus is based. I provide a source of standard currents from a master clock at the rate of 120 per minute, this being the rate of the particular balances described in this specification, and is taken merely for illustration on account of its being the rate of a common alarm clock, any other rate may be used to fit the time of the particular balances to be timed. The standard currents are used to run a phase changer consisting of a synchronous motor which has a device to make a contact 120 times a minute also, however the contact making device of the phase changer may be rotated, thereby changing the phase of said contacts as compared with the standard impulses. The purpose of this change will be apparent presently.

The X balance is put in a fixture and started in vibration. This fixture has a clamp in which the end of the hairspring is fastened, a second clamp having the function of the hairspring stud, and a pair of regulator pins one of which is insulated from the framework. The hairspring plays between these pins as the X balance vibrates. By a circuit, presently to be described, when the hairspring expands and makes contact with the insulated regulator pin it works a relay. As so far described we have (a) a series of standard currents (b) a series of currents reproducing the vibrations of the X balance (hereinafter called the X currents) and (c) means of bringing these two currents into phase, that is into co-incidence in time. The standard currents and the X currents are then led through a comparing circuit and associated galvanometer which will indicate the co-incidence in time of the two currents with any desired degree of exactness. When the currents are co-incident the galvanometer will be unmoved but as one current gains on the other the galvanometer will be deflected to one side or the other, thereby indicating which set of currents is gaining on the other. The hairspring of the X balance is adjusted accordingly, the currents again brought into phase and a new observation made. When the currents remain in phase for a certain time the X balance is taken as adjusted. To mention some specific figures, in a certain comparator circuit described herein a difference of 1/150 second in the coincidence of the standard and X currents can certainly be detected. Therefore if the standard and X currents run for 10 seconds without preceptably departing from phase the X balance is adjusted to an accuracy of better than one minute a day.

Figure 2:
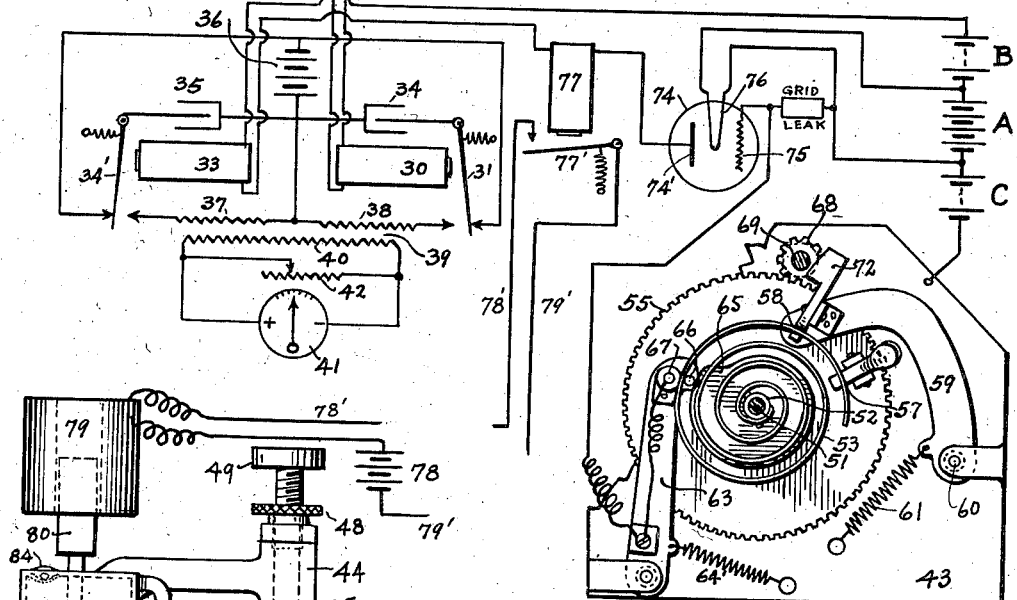
Figure 2:
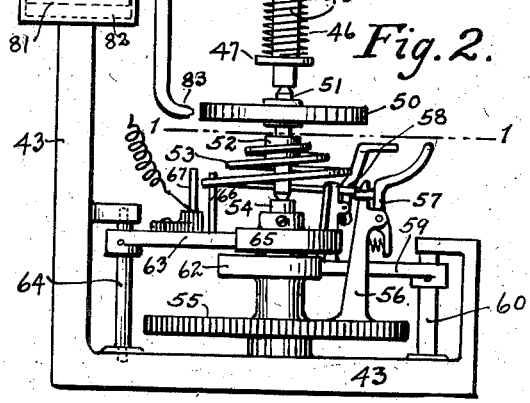
Figure 3:
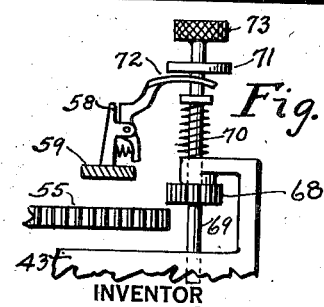
Figure 4:
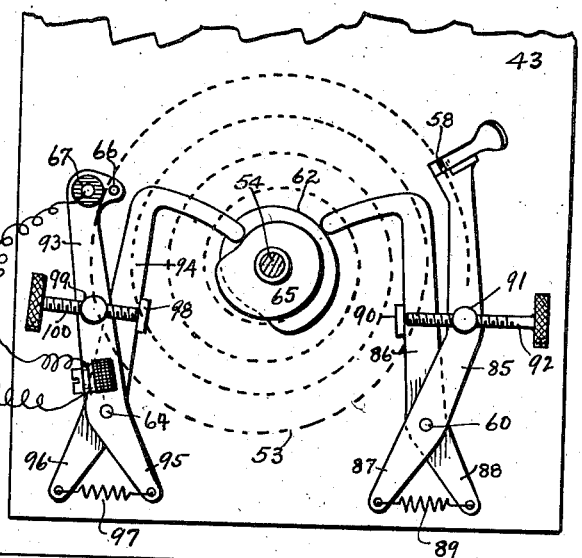
Figure 5:
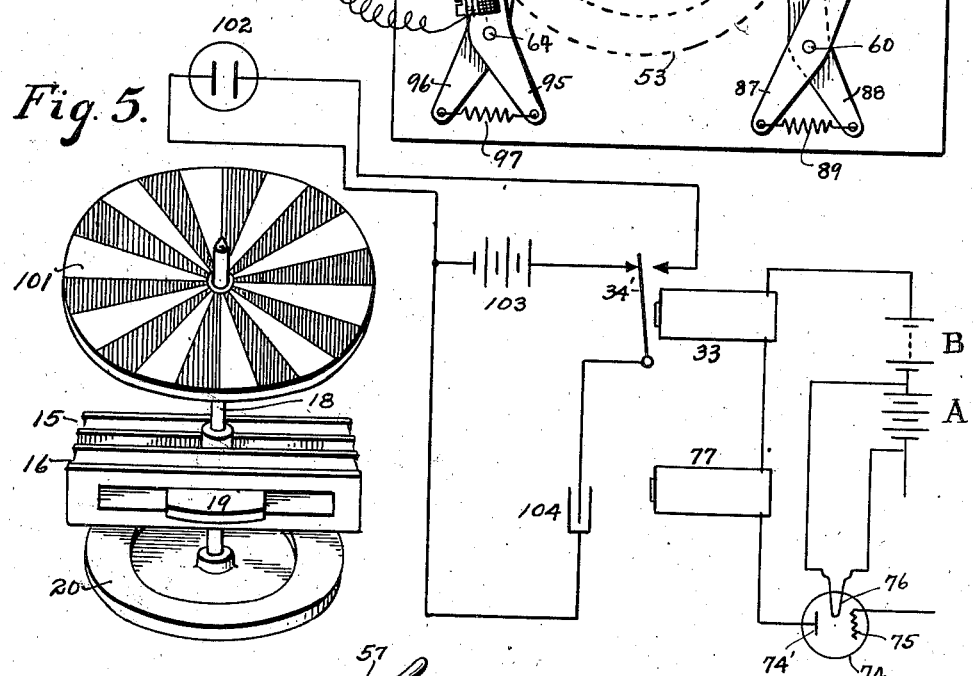
Figure 6:
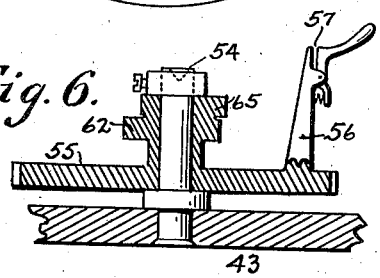

Referring now to the drawings, Fig. 1 is a diagrammatic layout of a preferred set of apparatus to carry out my invention, Fig. 2 is an elevation of part of the balance fixture, Fig. 3 is a detail of Fig. 2, Fig. 4 is a modification of Fig. 1 and Fig. 2 particularly in certain portions of the fixture for the X balances, Fig. 5 shows a stroboscopic disc apparatus for comparison, Fig. 6 is a detail of Fig. 1, Fig. 7 is a multivibrator circuit used for standard currents in certain circumstances, and Fig. 8 is a modification of the stroboscopic apparatus which uses a jump spark as an indication of the frequency of the standard and X impulses. It is to be noted that the plan of the fixture shown in Fig. 1 is taken from below the line 1—1 of Fig. 2. The same reference numerals refer to the same parts in all the figures.

In Fig. 1, 10 is a master clock preferably with a pendulum beating 120 beats per minute; it is furnished with some kind of a circuit making device (not shown) which makes the circuit including the relay 11 and a battery 12 120 times a minute. There are many devices suitable for this function in the prior art, I shall mention one shown in my Patent 1,310,374 of July 15, 1919. The relay 11 has an armature 13 which serves to close a circuit from a battery 14 through field coils 15 and 16 of a phase changer 17. A shaft 18 revolves on ball bearings in the framework of 17 and carries a permanent magnet 19 revolving in the field of the coils 15 and 16. The arrangement constitutes a synchronous motor revolving 120 R. P. M. in response to currents from the relay 11. The motor has to be started manually. The shaft 18 also carries a flywheel 20 to give the moving system a large moment of inertia. The flywheel 20 is frictionally secured to the shaft 18 or may have the rim hollow and be filled with mercury whose friction will damp out sudden changes in the velocity of the shaft 18. The shaft 18 also carries a cam 21 of insulating material adapted to raise a spring 22 from a contact 23 for a given arc of the revolution of the shaft 18; the spring 22 is mounted on and insulated from a wheel 24 which turns on a sleeve 25 in the framework of 17, said sleeve being concentric with the shaft 18 but free from it. On the under side of the wheel 24 and insulated from it is a slip ring 26 connected to the spring 22 by a wire 27 and having a brush 28 in continuous contact therewith. The brush 28 is insulated from the framework of 17 and is connected by a wire 29 to one pole of the battery 14 the other pole of which is connected through a relay 30 to the framework of the phase changer 17'. Each revolution of the shaft 18 accordingly results in the relay 30 attracting its armature 31. The currents, afterwards to be described, controlled by the relay 30 will hereinafter be called the standard currents since they reproduce the beats of the master clock 10. To provide for shifting the phase of the standard currents I have provided a pinion 32 meshing in the wheel 24 and mounted on a shaft 33' turning in the framework of 17. A handle 34 is on the shaft 33 by which it may be turned for rotating the wheel 24 and the spring 22 and contact 23 mounted thereon thus changing the time when the cam 21 breaks the circuit of the relay 30, and consequently changing the phase relation between the currents from the master clock 10 and those closed by the armature 31.

While the rotation of the shaft 18 is not absolutely uniform, it being accelerated during the time of the action of the currents from the relay 11 on the magnet 19 and decelerated by friction during the remainder of its arc, yet as will be pointed out hereinafter, it is necessary only that the interval between two successive currents be one half a second. So long as the accelerations, plus and minus, do not change during the period of an observation the requirement of a constant interval between transits of the shaft 18 past a given point will be met nearly enough for my purpose. For regulation, I have provided an adjustable shunt 32' to vary the current to the coils 15 and 16, so that the impulse may be suited to the load, this, in connection with the fly wheel 20 will keep the shaft 18 in rotation without undue hunting.

Passing for the moment description of the means by which the beats of the X balance are translated into a series of currents, assume that such a series are passed through a relay 33 having an armature 34'. The armatures 31 and 34' are respectively connected to condensers 34 and 35, the other sides of said condensers being common to a battery 36 and windings 37 and 38 of a transformer 39. The winding 37 is joined to the front contact of the relay 33 and 38 is similarly joined to the front contact of the relay 30. The back contacts of these relays are joined to the other pole of the battery 36; from these circuits it results that the condensers 34 and 35 are charged to the potential of the battery 36 when the relay armatures 31 and 34' are in contact with their back stops. When said armatures are pulled to their front stops the condensers are discharged through the transformer windings 37 and 38 which are connected to induce currents in contrary senses in a winding 40 to which is connected a galvanometer 41 with an adjustable shunt 42. Assume that the discharge of the condenser 34, which is charged in step with the standard currents, gives the needle of the galvanometer 41 a kick to the minus side, and a discharge from the condenser 35 kicks the needle to the plus side. The coils 37 and 38 and the condensers 34 and 35 are so adjusted that the simultaneous discharge of both condensers results in no motion of the needle. When the discharges get out of phase, the needle kicks to the one side followed immediately by a kick to the other side. The magnitude of the kicks increases as the impulses get more and more out of phase, and the gaining impulse may be inferred from the direction of the first kick.

The condenser circuit just described indicates a difference in phase with a sensitivity which is ample for the purpose desired. A galvanometer with differential windings may be used for the three winding transformer 39, however I use for a galvanometer a Weston commercial #375 instrument for the reason that the combination of this instrument and transformer is cheaper than an instrument with differential windings. It is not necessary that the condensers and the coils 37 and 38 be exactly balanced. An unbalanced discharge from the condenser 34 will give a kick in one direction. Similarly an unbalanced discharge from the condenser 35 will give a kick in the contrary direction. This, independent of the constants of the coils and condensers provided they are nearly equal, will give a null point at which the discharge of one condenser is neutralized by the discharge of the other. This point will gave a zero kick of the needle.

I will now describe the X balance fixture and circuits by which the vibrations of the balance are translated into a series of currents through the relay 33. A framework 43 supports an upper bearing 44 in which slides a rod 45 held in position by a spring 46 between a collar 47 on the rod 45 and the bearing 44. The lower end of the rod 45 has a socket for the X balance bearing and the upper end is threaded for an adjusting screw 48 which, by contact with the bearing 44 determines the position of the rod 45. A handle 49 on the rod 45 serves to withdraw it against the spring 46 when a new X balance is inserted.

An X balance 50 is mounted on a shaft 51 on which is a collet 52 providing an attachment for the inner end of a hairspring 53. The lower bearing of the shaft 51 is in a stud 54 mounted in the framework 43. Rotatably mounted on the stud 54 is a wheel 55 which carries an upright 56 on which is a clamp 57 for the outer end of the hairspring 53. The clamp 57 is below the collet 52 in order to pull the hairspring 53 into a cone shape to avoid interference with a second clamp 58 mounted on an arm 59 rigid with on a shaft 60 turning in the framework 43 and held by a spring 61 in contact with a spiral cam 62 rigid with the wheel 55. A second arm 63 is on a shaft 64 turning in the framework 43 and is held by a spring 64' in contact with a second spiral cam 65 rigid with the cam 62 and therefore with the wheel 55. The arm 63 carries regulator pins 66 and 67, the pin 67 being insulated from the framework 43. The hairspring plays between the pins 66 and 67 as the X balance vibrates; since the pin 67 is insulated from the framework, a circuit may be closed by the expansion of the spring 53 against said pin in a manner presently to be described. The regulator pins are placed the same angular distance from the clamp 58 as the regulator pins in the watch are placed from the hairspring stud (that is when the regulator is in its center position) so as to get substantially the same conditions of regulator pins as will be had in the watch.

The wheel 55 to which is attached the clamp 57 and the cams 62 and 65 may be turned by a pinion 68 on a shaft 69 turning and sliding in the framework 43 (Fig. 3) and held out of mesh with the wheel 55 by a spring 70. The shaft 69 carries a collar 71 which engages a tail 72 on the clamp 58 so as to disengage said clamp from the hairspring 53 when the wheel 55 is moved. A thumb nut 73 serves as a handle to turn the shaft 69.

The circuit by which the vibrations of the X balance are translated into vibrations of the relay armature 34' includes a triode 74 having a plate 74', a grid 75 and a filament 76 with the usual A, B, and C batteries. Contact of the hairspring 53 with the regulator pin 67 throws a blocking potential from the C battery on the grid 75 thereby cutting down the plate current, or stopping it as the case may be. In the plate circuit is a relay 77, for a purpose presently to be described and the relay 33. These relays are actuated in unison by flow of plate current when the grid 75 is unblocked, that is each time the X balance 50 vibrates.

The relay 77 closes a local circuit including a battery 78 and a solenoid 79, the latter on the frame 43. The solenoid 79 has a magnetic plunger 80 to which is a piston 81 working in a cylinder 82 and directing a jet of air tangentially against the X balance 50 through a nozzle 83 each time the piston is drawn up, that is each time the relay 77 is drawn up. This air jet keeps the X balance in vibration during test. A ball valve 84 admits air to the cylinder on the back stroke of the piston.

The operation of the complete device is as follows, the synchronous motor of the phase changer 17 is started and an X balance is put in the fixture 43, the hairspring is threaded through the regulator pins and gripped by the clamps 57 and 58. When the balance is at rest the hairspring is adjusted to be out of contact with either regulator pin. The balance is then started and kept going by the jets of air from the nozzle 83. The needle of the galvanometer will kick, since in general the X balance will not be in phase with the standard impulses. The handle 34 is turned to bring the standard and X currents in phase, as indicated by the galvanometer. However since the period of the X balance is not that of the standard the needle will start to kick to the one side or the other. The wheel 55 is turned by the nut 73 thereby changing the length of the hairspring. It will be observed that pressing the nut 73 to turn the wheel 55 will release the clamp 58. The two impulses are again brought to phase and it will now be a longer time before they depart therefrom. This process is repeated until the two impulses stay in phase 10 seconds. This corresponds to an accuracy of a minute a day. The two cams 62 and 65 have the same pitch as the hairspring so as the wheel 55 is turned the regulator pins and the clamp 58 will keep their same relative positions to the spring 53.

It sometimes happens that it is desired to adjust a balance whose hairspring does not conform to the spiral of the cams 62 and 65. For this case I use the structure shown in Fig. 4 in which the arms carrying the clip 58 and the regulator pins 66 and 67 are adjustable. Referring to this figure an arm 94 (corresponding to the arm 63 of Fig. 1) is rigid on the shaft 64; turning on the same shaft is an arm 93 which carries the regulator pins 66 and 67, the latter insulated from said arm. The arms 93 and 94 are provided with tails 95 and 96 which are pulled toward each other by a spring 97. The arm 93 carries a stud 99 in which is an adjusting screw 100 which bears against an ear 98 on the arm 94. Motion of the screw 100 will change the distance between the arms 93 and 94, and the distance of the regulator pins 66 and 67 from the center of the spring 53 may be changed independent of the position of the cam 65. A similar arrangement obtains for the arm 86 rigid with the shaft 60 on which turns an arm 85 having a tail 87 joined by a spring 89 to a tail 88 on the arm 86 which has an ear 90 to take the thrust of a screw 92 mounted in a stud 91 in the arm 85 which carries the clip 58. Thus the clip 58 may be adjusted independent of the cam 62 so that the hairspring may be centered. To adjust the clip 58 one turns the screw 92 until the hairspring is central. The regulator pins 67 and 66 may be adjusted by the sound of the relay 77 which will beat evenly like a clock in beat when the hairspring is central between the regulator pins.

Having described my preferred apparatus I shall now show some modifications of it. In Fig. 5 I have shown a stroboscopic disc 101 mounted on the shaft of the synchronous motor of the phase changer 17, the contacts 22 and 23 are not used in this arrangement. The disc 101 is momentarily illuminated by a neon lamp 102 lit by the discharge of a condenser 104 charged and discharged by the armature 34' of the relay 33. A battery 103 serves to charge the condenser to a voltage to light the lamp 102. The disc rotates at the standard rate or an integral multiple thereof. If the X balance is fast the disc will appear to turn in the direction of the shaft 18. If slow, it will appear to turn in the reverse direction. The nut 73 is adjusted until the disc appears stationary.

While the disc arrangement of Fig. 5 is simpler than the condenser arrangement of Fig. 1 it is not so good for continuous work. The intermittent flashing of the lamp is quite tiresome to the eyes of the operator.

An analogous arrangement is shown in Fig. 8 in which the disc 101 is replaced by a pointer 105 on the shaft 18 on which is an insulating washer 105' to which the pointer 105 is fastened. A brush 107' bears on a slip ring 106' which is connected to the pointer 105 by a wire 108'. An induction coil 108 has its high winding 107 connected to the brush 107', and hence to the pointer 105, and to a ring 106 insulated from the framework. A condenser 104 is charged from a battery and discharged through a low winding 109 of the coil 108 by the relay 33, which it will be remembered is actuated in unison with the X balance. Each time the condenser is discharged a spark will jump from the pointer to the ring and indicate the instantaneous position of the pointer. The fact of the pointer spark remaining stationary will be an indication of the X balance being in time with the standard impulses. Motion of the spark may be corrected by changing the length of the hairspring by rotating the wheel 55 of the fixture 43.

I have noted that the motion of the shaft under the currents from the clock 10 is not rigorously uniform since there is but one impulse per revolution. For most commercial work this is accurate enough, however if higher accuracy is worth the expense, increasing the currents per revolution of the shaft 18 will give it. To carry out this plan a source of regulated currents must be provided, if one uses a current of 60 cycles per second the 2 cycle motor of the magnet 19 and the coils 15 and 16 is replaced by a 60 cycle synchronous motor. Those used for running clocks will answer very well. One suitable source of current is described in the paper by Lewis on A clock controlled constant frequency generator in the Bureau of Standards Journal of Research for Jan. 1932. However a simpler and less costly way of securing a constant frequency current of 20 cycles per second is shown by me in Fig. 7. As before there is the clock 10 working a relay 11' 2 times per second and whose armature 110 serves to charge a condenser 112 to the potential of a battery 111 and discharge the condenser through a winding 113 of a transformer 114 whose winding 115 serves to control a multivibrator circuit adjusted to oscillate 20 times per second. This circuit is well known in the radio art. It consists of triodes 116 and 117 whose plates are connected through resistances 118 and 119 to the positive pole of a battery 120 and whose grids are connected through resistances 122 and 123 to the negative pole of the battery 120 which is also common to the two filaments as shown. Condensers 124 and 125 connect the grid of each triode with the plate of the other. A full description of the action of this circuit may be found in Radio Engineering Principles, Lauer and Brown, 2nd. ed. pp. 208 et. seq. The circuit of the figure is adjusted to 20 oscillations per second and each tenth oscillation it receives a jolt from the discharge of the condenser 112 which serves to wipe out the accumulated errors and start the oscillations in step with the clock again.

The current from the multivibrator is of small wattage and before being used to drive a synchronous motor must be amplified. To this end I have provided a transformer 127 to put the 20 cycle current on the grid of an amplifying tube 126 the plate current of which runs a synchronous motor 130 on the shaft 18 of a phase changer 17 or of the devices shown in Figs. 5 and 8. The wattage taken by the grid of the tube 126 is small, we may therefore have a second tube 128 amplifying current for a second motor 129 governed by the current from the transformer 127. This will be of use where there are a number of adjusting stations as in a factory. All may be governed by the same source of standard currents.

Another method of using the apparatus in Fig. 1 is founded on the fact that to a first approximation, the number of vibrations in a given time is inversely proportional to the length of the hairspring. Hence in testing a balance one may watch the galvanometer 41 a certain time (to be determined by experiment) keeping the needle stationary by turning the handle of the phase changer 17. At the end of this time the phase changer has been rotated through a certain angle, if then the hairspring be changed the same angle by the handle 73 the balance will be nearly on time. To assist in this operation the handles 34 and 73 may be correspondingly graduated, and the balance may be brought to time in a couple of trials.

In Fig. 1, for the sake of clearness, the cam 21 and the spring 22 are much larger in proportion to the size of the phase changer 17 than these parts would be in practice where the cam 21 should have a radius about 1/20 of the radius of the wheel 20 and the spring 22 should be made as light as possible. This is to keep the load on the synchronous motor of the phase changer as light as possible. In some cases it may be of advantage to use a triode circuit for this contact as is shown in connection with the hairspring and triode 74. Such a modification may be readily made by those skilled in the art from the description of the circuit herein associated with the triode 74.

It will be noted in Fig. 8 that I have provided the ring 106 with graduations. These are for the purpose of noting the amount the jump spark travels in a given time and thus obtain an indication of the error of the X balance. The hairspring 53 is then changed accordingly by means of the handle 73 which may be provided with suitable graduations.

In some of the following claims I have used the term "X balance" by which I mean a balance under test in the testing fixture 43. By the term "X currents" I mean a series of currents controlled by an X balance and kept in step therewith. By the term "standard currents" I mean a series of currents accurate as to time against which the X balance is checked.

The pneumatic impulse from the nozzle 83 has an automatic compensation to keep the balance at a constant arc. The effective impulse is due to the difference in velocity between the air jet and rim of the X balance on which the jet impinges. Increase of the balance arc means increase of velocity and hence decreased impulse. So the balance arc increases until it reaches a point where the effective impulse is equal to the friction losses and remains at that point.

I consider the use of a triode as a part of the apparatus for translating the vibrations of the X balance, or any balance, into a series of currents of great advantage. By its use I am enabled to take advantage of the contact of the hairspring itself with a pin insulated therefrom, which pin may be in the position of the ordinary regulator pin, to open and close the circuit in which flow the X currents. The clock hairspring is ordinarily of steel and coated with a blue oxide of iron, a bad and unreliable conductor of electricity. However by placing this hairspring contact in the grid circuit of a triode the current broken is of the order of a few micro-amperes, and one may place a resistance of a megohm in the grid circuit without interfering with its certain and reliable action. A voltage wave blocks off the plate current and there is no induction spark with its concomitant corrosion at the hairspring contact. Further, since the pin is in the place of the regulator pin the time of the balance is not changed.

In some of the claims I have referred to the instantaneous position of the balance. Since the balance must be in a certain position when the hairspring makes contact with the insulated pin 67, the resulting change of current, as shown by the action of the relay 33 is an indication of the position of the balance at that instant.

Many changes may be made in the precise structure herein shown without departing from the scope of my invention, since I claim:—

1. In a device for testing balances, means operated by the balance to produce periodic electric impulses, a condenser, means to charge and discharge said condenser in step with said impulses, a standard source of electric impulses, a second condenser, means to charge and discharge said second condenser in step with said standard impulses, and means to detect a time interval between the discharge of said condensers.

2. In a device for testing balances, means operated by the balance for producing periodic electric impulses, a condenser, means to charge and discharge said condenser in step with said impulses, a source of standard electric impulses, a second condenser, means to charge and discharge said second condenser in step with said standard impulses, and means to bring the discharges of said condensers into coincidence.

3. In a device for testing balances, means operated by the balance to produce periodic electric impulses, a condenser, means to charge and discharge said condenser in step with said impulses, a source of standard electric impulses, a second condenser, means to charge and discharge said second condenser in step with said standard impulses, and a galvanometer responsive to the discharge of both condensers to indicate a phase difference in the discharge of said condensers.

4. In a balance testing apparatus, impulsing means for keeping the balance to be tested in vibration without affecting the rate of vibration of said balance, a triode and an associated grid circuit containing a grid blocking potential and an associated plate circuit, means operated by said balance for opening said grid circuit, and means in said plate circuit to operate said impulsing means.

5. In an apparatus for testing a balance and hairspring, a triode and an associated grid circuit containing a grid blocking potential and an associated plate circuit, and a fixed means co-operating with said hairspring for opening said grid circuit.

6. In an apparatus for testing a balance and hairspring, a triode and associated plate circuit and an associated grid circuit containing a grid blocking potential, a fixed means co-operating with said hairspring for opening said grid circuit, an electromagnet in said plate circuit, an armature associated with said electromagnet, whereby the vibrations of said balance are translated into motions of said armature.

7. In a balance testing apparatus, a triode having a plate circuit and a grid circuit including a grid blocking potential, a fixed means operated by said balance to open said grid circuit in step with said balance, means in said plate circuit to produce a series of impulses in step with said balance, a source of standard impulses, and means to detect a difference in phase of the two said sets of impulses.

8. In combination, a standard clock capable of producing a series of impulses, a motor driven in step with said impulses, a shaft driven by said motor, a set of contacts capable of being rotated around said shaft, support means for said contacts, means for causing a current to flow through said contacts, a cam on said shaft for opening said contacts as said shaft revolves, and manual means to shift said contact supporting means angularly around said shaft, whereby the impulses produced by virtue of the opening and closing of said contacts may be shifted in phase with respect to said standard impulses.

9. In an apparatus for testing a balance and hairspring, a fixed pin insulated from the hairspring and adapted to make contact therewith as the balance vibrates, a triode having a plate circuit associated therewith and a grid circuit containing a grid blocking potential, said grid circuit having said hairspring and pin in series therein to open and close said grid circuit in step with the vibrations of said balance and an electromagnet in said plate circuit.

10. In an apparatus for testing a balance and hairspring, a triode having a plate circuit and a grid circuit containing a grid blocking potential, a fixed pin in said grid circuit adapted to be engaged by the hairspring as the balance vibrates, and a relay and associated armature in said plate circuit whereby the vibrations of said balance are translated into actuations of said armature.

11. In a balance testing apparatus, a triode having a plate circuit and a grid circuit including a grid blocking potential, a fixed means operated by said balance to open said grid circuit in step with said balance, means in said plate circuit to produce a series of impulses in step with said balance, a source of standard impulses, a synchronous motor operated by said standard impulses, and means jointly operated by said synchronous motor and said balance impulses, whereby a difference in phase of said balance impulses and said standard impulses may be detected.

12. In a device for testing balances, means operated by the balance for producing periodic electric impulses, a condenser, means to charge and discharge said condenser in step with said impulses, a source of standard electric impulses, impulse translating means operated by said standard impulses, a second condenser, means to charge and discharge said second condenser in step with said translated impulses, and means whereby the charges on said two sets of condensers may be compared.

13. In a device for testing balances, means operated by the balance for producing periodic electric impulses, a condenser, means to charge and discharge said condenser in step with said impulses, a source of standard electric impulses, impulse translating means operated by said standard impulses, a second condenser, means to charge and discharge said second condenser in step with said translated impulses, and means responsive to the discharge of both sets of condensers whereby a difference in time of the discharges of said condensers may be observed.

14. In a device for testing balances, means operated by the balance to produce periodic electric impulses, a condenser, means to charge and discharge said condenser in step with said impulses, a standard source of electric impulses, a second condenser, means to charge and discharge said second condenser in step with said standard impulses, a common circuit responsive to the discharge of both condensers, and indicating means in said circuit.

ARTHUR F. POOLE.